United States Patent
Jiang et al.

(10) Patent No.: US 11,188,702 B1
(45) Date of Patent: Nov. 30, 2021

(54) DYNAMIC WEIGHTING SCHEME FOR LOCAL CLUSTER REFINEMENT

(71) Applicant: Cadence Design Systems, Inc., San Jose, CA (US)

(72) Inventors: Bentian Jiang, Shatin (HK); Natarajan Viswanathan, Austin, TX (US); William Robert Reece, Over (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/139,617

(22) Filed: Dec. 31, 2020

(51) Int. Cl.
 *G06F 30/392* (2020.01)
 *G06F 30/398* (2020.01)
 *G06F 119/18* (2020.01)

(52) U.S. Cl.
 CPC .......... *G06F 30/392* (2020.01); *G06F 30/398* (2020.01); *G06F 2119/18* (2020.01)

(58) Field of Classification Search
 USPC ........................................................ 716/119
 See application file for complete search history.

(56) References Cited

U.S. PATENT DOCUMENTS

| 6,567,957 | B1* | 5/2003 | Chang ..................... G06F 30/30 716/102 |
| 10,289,797 | B1* | 5/2019 | Viswanathan ........ G06F 30/392 |
| 2001/0048333 | A1* | 12/2001 | Fujii ....................... G06F 30/30 327/270 |
| 2014/0282300 | A1* | 9/2014 | Katakamsetty ....... G06F 30/398 716/53 |

* cited by examiner

*Primary Examiner* — Mohammed Alam
(74) *Attorney, Agent, or Firm* — Schwegman Lundberg & Woessner, P.A.

(57) ABSTRACT

Aspects of the present disclosure address systems and methods for local cluster refinement for integrated circuit (IC) designs using a dynamic weighting scheme. Initial cluster definitions are accessed. The initial cluster definitions define a plurality of clusters where each cluster includes a plurality of pins. Each cluster is evaluated with respect to one or more design rule constraints. Based on the evaluation, clusters are identified from the plurality of clusters. A set of refinement candidates are generated based on the one or more clusters. A scoring function that employs a dynamic weighting scheme is used to determine a refinement quality score for each refinement candidate in the set of candidates and one or more refinement candidates are selected from among the set of refinement candidates based on respective refinement quality scores. A refined clustering solution is generated based on the selected refinement candidates.

20 Claims, 5 Drawing Sheets

DYNAMIC WEIGHTING SCHEME FOR LOCAL CLUSTER REFINEMENT

TECHNICAL FIELD

The present disclosure generally relates to the technical field of integrated circuit (IC) design. In particular, the present disclosure addresses systems and methods for designing a clock tree for an IC.

BACKGROUND

An integrated circuit (IC) layout specifies portions of various components of an IC. When the IC is to include a large number of registers, latches, flip-flops, and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of fan-out buffers, clock gates, and/or other types of clock logic (collectively referred to hereinafter as "clock nodes"). A clock tree includes a hierarchy of fan-out buffers (which may or may not invert the clock signal), clock gates, and/or clock logic for fanning the clock tree out from one or more buffers at a top level of the hierarchy to a large number of buffers or clock gates at the lowest level of the hierarchy that drive the clock inputs of the sinks.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
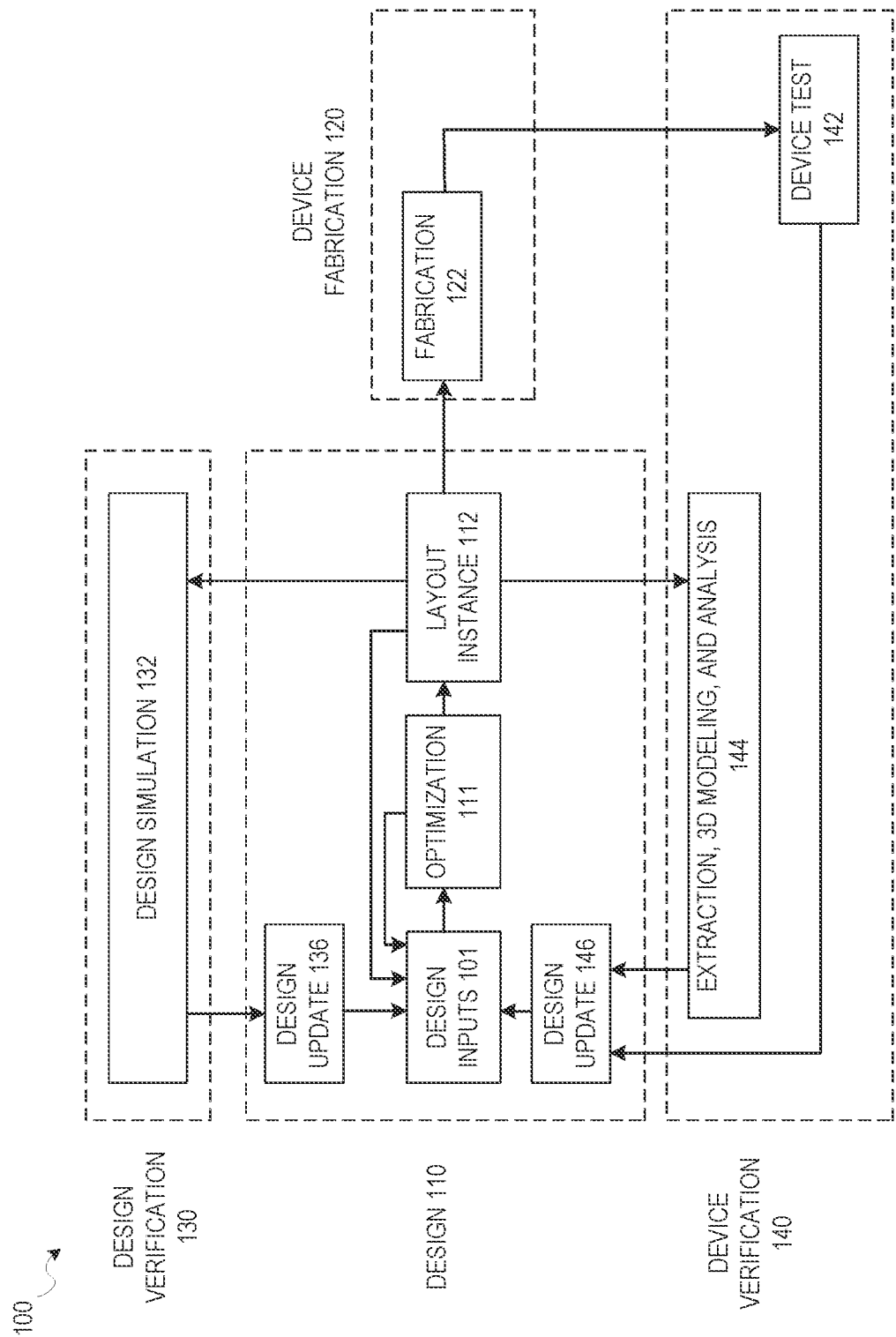
FIG. 1 is a diagram illustrating a possible design process flow which includes elements for locally refining clock tree structures using a dynamic weighting scheme, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

After establishing positions of all clock nodes and routing signal paths between the clock nodes and the sinks, a clock tree synthesis (CTS) tool estimates the path delays from the clock tree root to all sinks and then inserts additional buffers into various branches of the clock tree as needed to reduce variations in path delays to the sinks, thereby balancing the clock tree. Conventional approaches to positioning fan-out buffers involve grouping sinks in a process referred to as "clustering." During clustering, sinks are grouped into a set of clusters such that each cluster has no more than the number of sinks that can be driven by a single fan-out buffer. Sinks are typically clustered using one of two approaches—a geometry-based approach and a load-based approach.

In an example of the conventional geometry-based approach to clustering, sinks are grouped into clusters such that the clusters have approximately equal spans. With this approach, a portion of the clusters may be sparsely populated with sinks while other clusters may be densely populated with sinks. The geometry-based approach may result in a large number of clusters, which may increase power consumption. Further, the geometry-based approach may be overly time consuming for designs with a large number of sinks.

In an example of the conventional load-based approach to clustering, sinks are grouped into clusters such that the clusters have approximately equal loads (e.g., total pin and wire capacitance). However, this approach frequently results in clusters with large spans that potentially violate transition and skew constraints for the design.

To address the forgoing issues with conventional clustering techniques, local cluster refinements may be performed. Local cluster refinement techniques involve evaluating clusters of an initial clustering solution with respect to design rule constraints of an IC design. The design rule constraints set forth target values for design metrics such as transition, skew, and total capacitance of clusters. In these conventional techniques, a scoring algorithm with predetermined static weights for each design metric are used to assess which local cluster refinements are to be performed, which may lead to increased clock buffer count, area, and power consumption in the resulting clustering solutions.

For example, typical local cluster refinement techniques include pin move refinements and local reclustering. During pin move refinement, pins from clusters that fail to satisfy targets imposed by design rule constraints (also referred to as "failing" clusters) are moved to nearby clusters that satisfy the targets imposed by design rule constraints (also referred to as "passing clusters"). During local reclustering, failing clusters and other nearby clusters are dissolved and a new set of clusters are created from the pins of the dissolved clusters.

Traditionally, both techniques for local cluster refinements only address failing clusters because of the static weights in the scoring function used to assess refinements. That is, local cluster refinements are used to eliminate failing clusters from clustering solutions and once failing clusters are eliminated, no further refinements are performed even if some clusters barely satisfy design rule constraints. Thus, although these conventional local refinement techniques lead to clustering solutions in which all clusters are passing, these clustering solutions are often suboptimal because they are overly large, have an unnecessarily large number of buffers, and consume large amounts of power. Hence, these clustering solutions can be further optimized by refining barely passing clusters as well as failing clusters.

Aspects of the present disclosure include software stored on computer-readable media, which when read and executed by a machine, configures the machine to include a clock tree synthesis (CTS) tool that uses a dynamic weighting scheme for local cluster refinements. Contrary to conventional techniques that rely simply on static weights for each design metric, the dynamic weighting scheme includes dynamically determined weights used to represent the importance of each design metric thereby allowing the CTS tool to refine barely passing clusters (e.g., clusters that satisfy design rule constraints by less than a predefined margin) in generating optimal clustering solutions. By locally refining clusters using this dynamic weighting scheme, the CTS tool may provide an advantage over conventional techniques by improving clock buffer count, area, and power during clock tree construction.

In accordance with some embodiments, the CTS tool access initial cluster definitions for an IC design. The initial cluster definitions define a plurality of clusters where each cluster includes a plurality of pins and each pin corresponds to a clock sink in of clock net. The CTS tool evaluates each cluster with respect to one or more design rule constraints (e.g., defining target values for transition, skew, and total capacitance of clusters). Based on the evaluation, the CTS tool identifies critical clusters from the plurality of clusters. The critical clusters are clusters that are barely passing the one of more design rule constraints. That is, a critical cluster is a cluster that satisfies the one or more design rule constraints by less than a threshold margin. The CTS tool generates a set of refinement candidates based on the one or more critical clusters. The CTS tool generates a refinement candidate by moving one or more pins from a critical cluster to one or more neighboring clusters.

The CTS tool uses a scoring function that employs the dynamic weighting scheme to determine a refinement quality score for each refinement candidate in the set of candidates. The CTS tool selects one or more refinement candidates from among the set of refinement candidates based on respective refinement quality scores and generates a refined clustering solution based on the selected refinement candidates.

FIG. 1 is a diagram illustrating one possible design process flow which includes elements for locally refining a clock tree structure, according to some embodiments. It will be apparent that other design flow operations may function using the timing constraints and optimizations described herein, but a design flow 100 is described here for the purposes of illustration. As illustrated, the design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where a CTS tool generates initial layouts for a clock tree structure and sinks, before refinements are made to ensure that timing requirements for each sink are met. The initial layouts for the balanced clock tree structure and sinks include an initial clustering solution for grouping the sinks. The initial strategy, tactics, and context for the device to be created are also generated in the design input operation 101, depending on the particular design algorithm to be used.

In some embodiments, following an initial selection of design values in the design input operation 101, the CTS tool performs clock tree synthesis and associated timing analysis and optimization (e.g., refinements to the clock tree structure) according to various embodiments, along with any other automated design processes, at an optimization operation 111. The optimization operation 111 with respect to clock tree synthesis may include performing local cluster refinements using a dynamic weighting scheme.

Design rule constraints for a clock tree structure may be initiated with design inputs in the design input operation 101, and then may be analyzed using timing analysis according to various embodiments. While the design flow 100 shows such optimization occurring prior to a layout instance 112, such timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 122, Certain embodiments of operations described herein for refining a clock tree structure may therefore involve iterations of the design input operation 101, optimization operation 111, and layout instance 112 generation. In other systems, other design processes may be used.

After design inputs are used in the design input operation 101 to generate a circuit layout, and any optimization operations 111 (e.g., local refinement transforms) are performed, a layout is generated in the layout instance 112. The layout describes the physical layout dimensions of the device that match the design inputs. This layout may then be used in the device fabrication operation 122 to generate a device, or additional testing and design updates may be performed using designer inputs or automated updates based on design simulation 132 operations, or extraction, 3D modeling, and analysis 144 operations. Once the device is generated, the device can be tested as part of device test 142 operations, and layout modifications generated based on actual device performance.

As described in more detail below, design updates 136 from the design simulation 132 operations; design updates 146 from the device test 142 or extraction, 3D modeling, and analysis 144 operations; or further direct design input operations 101 may occur after an initial layout instance 112 is generated. In various embodiments, whenever design inputs are used to update or change an aspect of a circuit design, a timing analysis and an optimization operation 111 may be performed.

Figure 2:
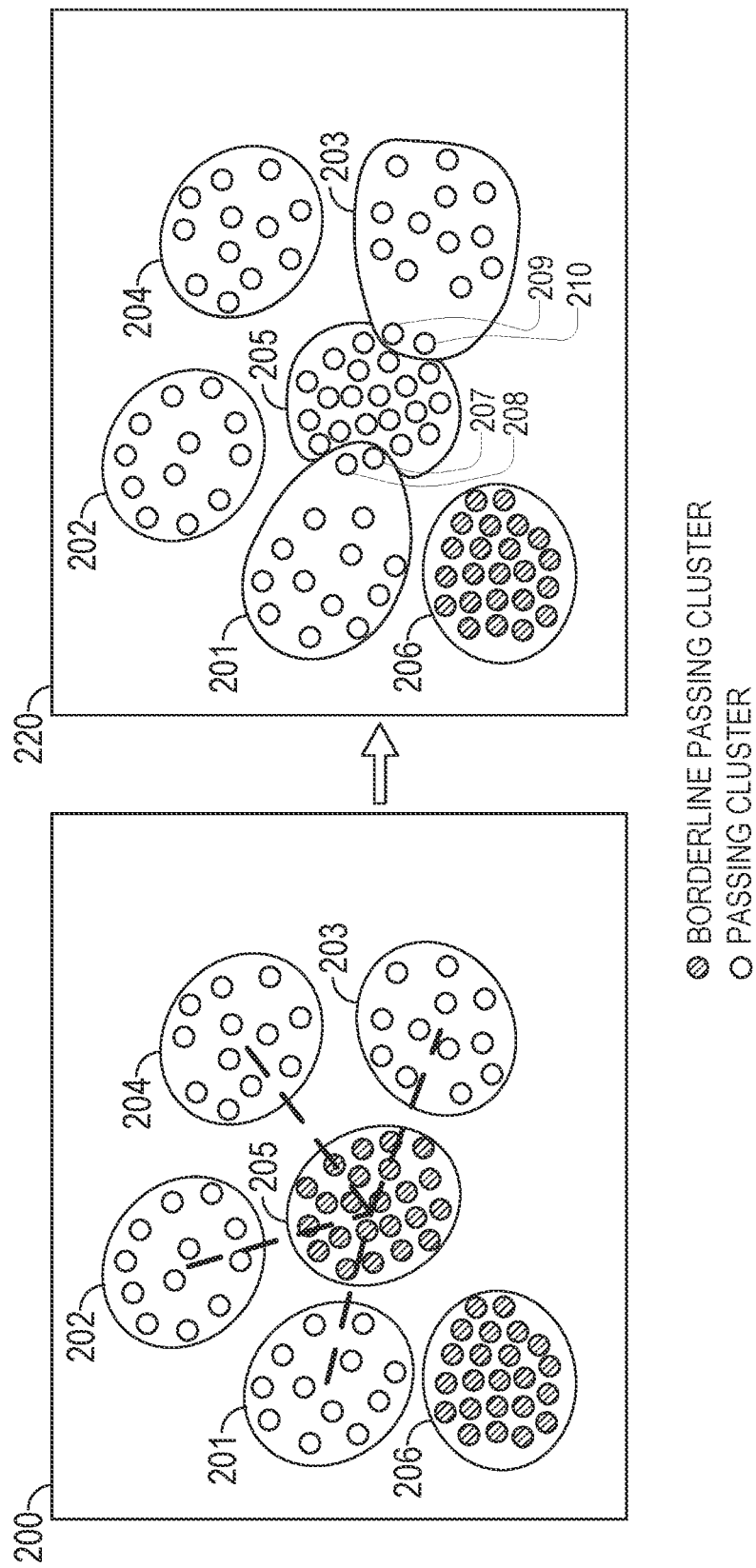
FIG. 2 is a conceptual diagram that graphically illustrates a method for local cluster refinement with a dynamic weighting scheme, which may be performed as part of the method for refining clusters of a clock tree structure, according to some embodiments.

FIG. 2 is a conceptual diagram that graphically illustrates a method for local cluster refinement with a dynamic weighting scheme, which may be performed as part of the method for refining clusters of a clock tree structure, according to some embodiments. Shown in FIG. 2 is a set of clusters comprising clusters 201-206. The set of clusters are defined by an initial clustering method 200 for a clock net generated by the CTS tool, Each of the clusters 201-206 includes a group of pins and the pins may, for example, correspond to input pins of flops or IP blocks for lowest-level (e.g., leaf-level) clustering, or input pins of clock drivers or clock gates for higher levels of clustering.

Clusters 201-206 are evaluated with respect to one or more design rule constraints (e.g., transition, skew, and total cluster capacitance targets). As shown in FIG. 2, the clusters 201-206 are classified according to their degree of satisfaction of the one or more design rule constraints. More specifically, the CTS tool classifies the initial clusters 201-206 according to the following classifications: "Borderline Passing" if the cluster satisfies the design rule constraints by less than a predefined margin (e.g., 10% or less) or "Passing" if the cluster satisfies the design rule constraints by at least the predefined margin.

As shown, the clusters 201-204 are classified as passing, and the clusters 205 and 206 are classified as borderline passing. In this example, the CTS tool may select and target the cluster 205 for local pin move refinement based on the cluster 205 being a borderline passing cluster. That is, although the cluster 205 satisfies the one or more design rule constraint, the margin of satisfaction of the one or more design rule constraints is small and thus there is potential to improve the cluster 205 through movement of one or more pins to another cluster in the set, To this end, the CTS tool identifies passing clusters that neighbor the cluster 205 (e.g., nearby clusters), which in this example correspond to clusters 201-204.

As shown in FIG. 2, the CTS tool moves pins from the cluster 205 to the neighboring passing clusters 201 and 203 to produce refined cluster solution 220 that includes refined clusters that each satisfy the design rule constraint targets by at least the predefined margin. The CTS tool may iteratively move pins from the cluster 205 to the neighboring clusters until the cluster 205 meets the design rule constraint targets by at least the predefined margin. In this particular example, the CTS tool moves pins 207 and 208 from the cluster 205 to the cluster 201 and moves pins 209 and 210 from the cluster 205 to the cluster 203. As a result, the refined cluster 205 becomes a passing cluster, and the refined clusters 201 and 203 remain passing clusters.

The refined clustering solution 220 may be one of multiple refinement candidates and may be selected for instantiation as the refined clustering solution 220 based on a refinement quality score determined by the CTS tool. The refined clustering solution 220 may further be one of multiple refined clustering solutions implemented by the CTS tool based on the multiple refinement candidates. The refinement quality score is calculated by the CTS tool using a scoring function that includes one or more attenuation factors determined based on target metric values. Further details regarding the method of pin move refinement are discussed below in reference to FIGS. 3 and 4.

Figure 3:
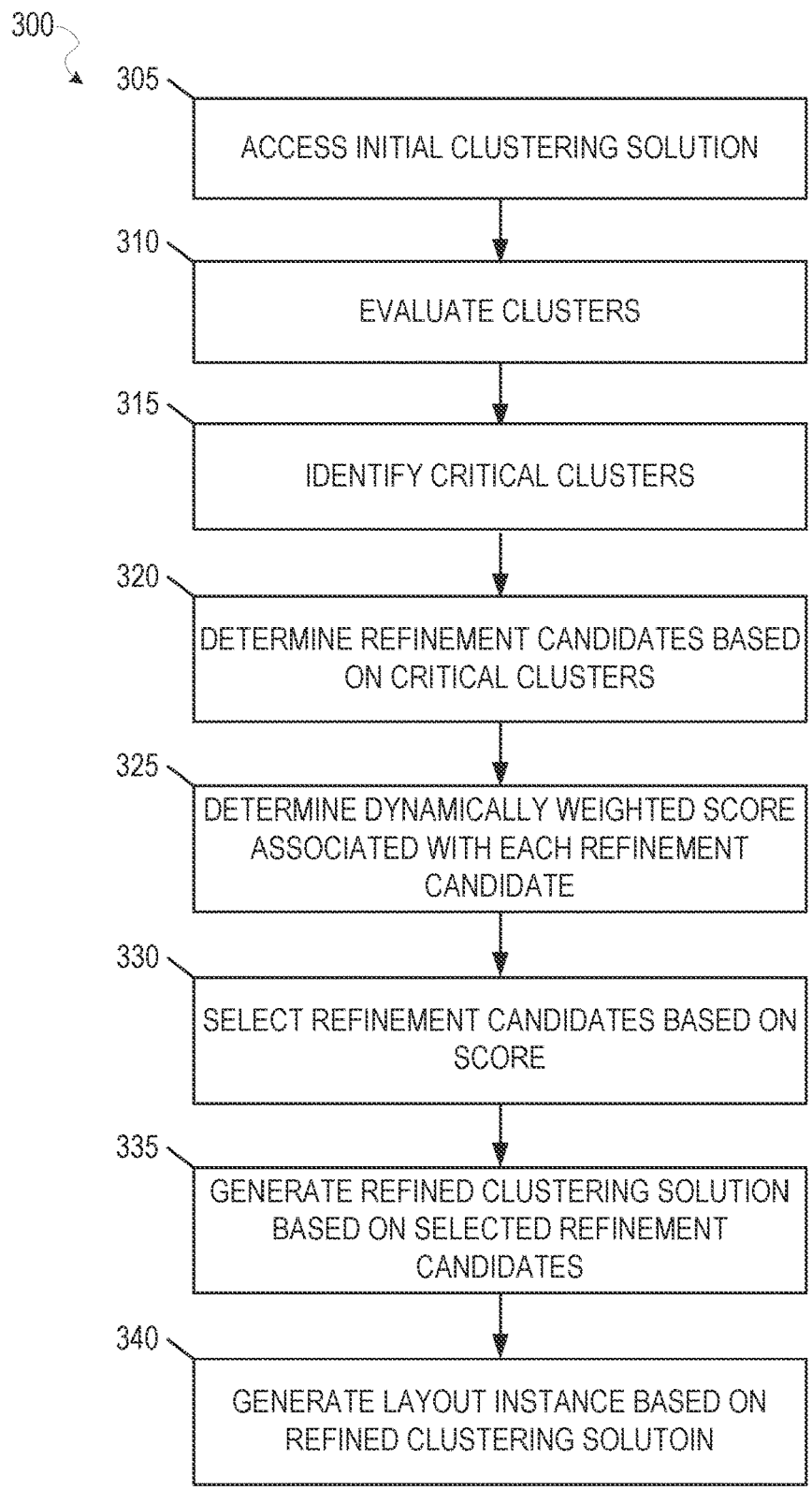
FIGS. 3 and 4 are a flowchart illustrating operations of a method for local cluster refinement with a dynamic weighting scheme, according to some example embodiments.
Figure 4:
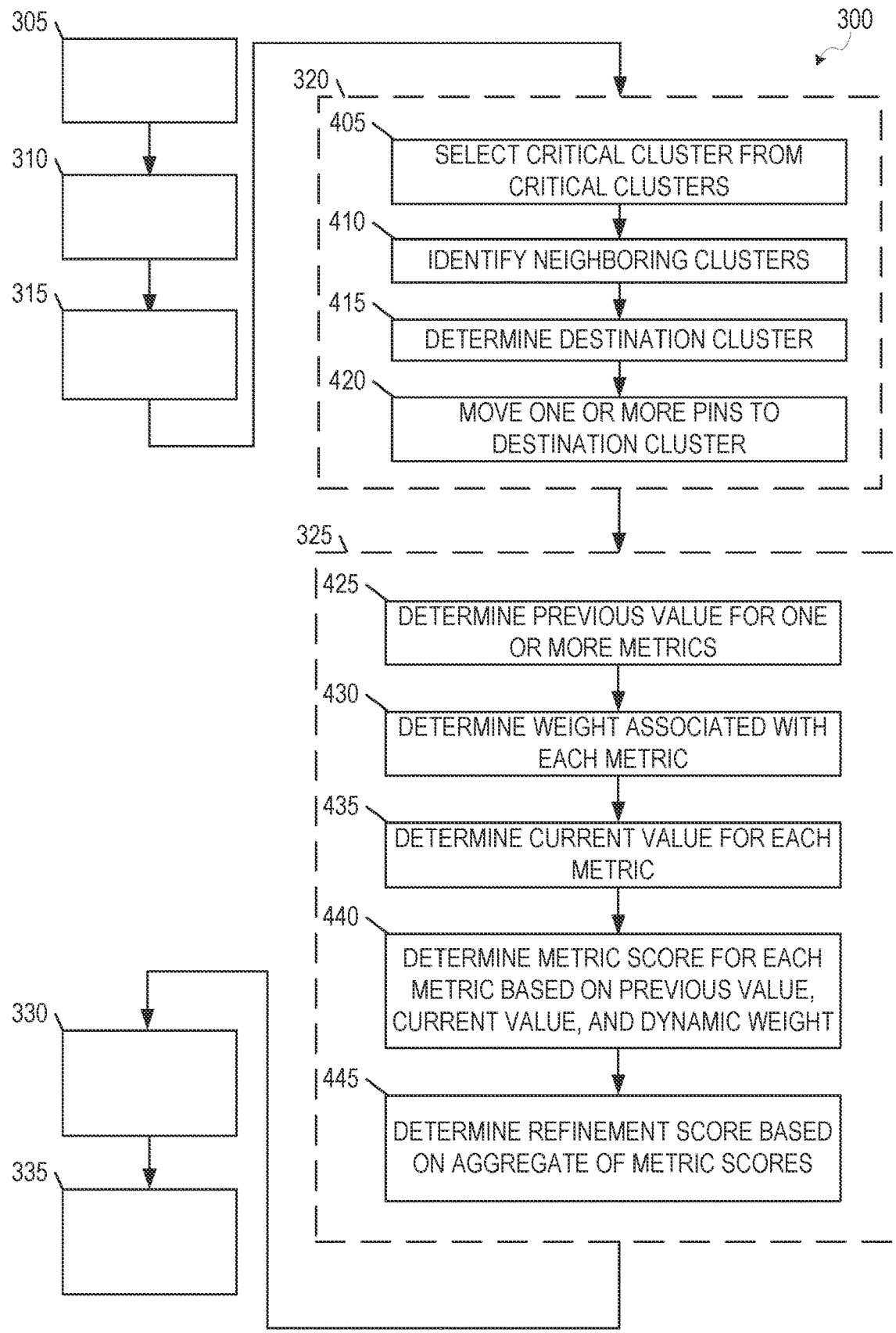

FIGS. 3 and 4 are a flowchart illustrating operations of a method 300 for local cluster refinement with a dynamic weighting scheme, according to some example embodiments. For some embodiments, the method 200 is performed as part of an optimization process applied to a circuit design (e.g., by CTS tool of an EDA software system).

It will be understood that the method 300 may be performed by a computing device, such as a computing device executing instructions of an EDA software system that includes a CTS tool. For example, the operations of a method 300 may be represented by executable instructions (e.g., EDA software) that, when executed by a processor of a computing device, cause the computing device to perform the method 300. Thus, any one or more operations of the method 300 may be performed by a hardware processor (e.g., central processing unit or graphics processing unit) of a computing device (e.g., desktop, server, etc.). Accordingly, the method 300 is described below in reference to such a computing device.

However, it shall be appreciated that the performance of the method 300 is not intended to be limited to such hardware configurations, and at least some of the operations of the method 300 may be deployed on various other hardware configurations. For example, some embodiments comprise a device that includes a memory with a circuit design, and processing circuitry configured into a special device to perform the operations of the method 300.

Depending on the embodiment, an operation of the method 300 may be repeated in different ways or involve intervening operations not shown. Though the operations of the method 300 may be depicted and described in a certain order, the order in which the operations are performed may vary among embodiments, including performing certain operations in parallel.

At operation 305, the computing device accesses an initial clustering solution for an IC design. The initial clustering solution comprises cluster definitions that define an initial set of clusters, each of which includes a group of pins. The pins may, for example, correspond to input pins of flops or IP blocks for lowest-level (e.g., leaf-level) clustering, or input pins of clock drivers or clock gates for higher levels of clustering.

The computing device, at operation 310, evaluates each of the clusters with respect to one or more design rule constraints for the IC design. The one or more design rule constraints may include targets for timing characteristics of the clusters, including transition and skew in addition to loading characteristics of the clusters (e.g., based on a total capacitance of the clusters). Accordingly, in evaluating a cluster, the computing device determines the timing characteristics (e.g., timing metric values) of the cluster and compares the determined timing characteristics with timing targets (e.g., target metric values) imposed by the one or more design rule constraints. For example, the computing device may analyze each cluster to determine the transition of each cluster and compare the transition of each cluster to a target transition imposed by the design rule constraints. In another example, the computing device may analyze each cluster to determine the skew of each cluster and compare the skew of each cluster to a target skew imposed by the design rule constraints. The computing device may further determine loading characteristics of each cluster and compare the loading characteristics with loading targets imposed by the one or more design rule constraints.

The computing device may further classify each cluster according to a status of the cluster in satisfying the one or more design rule constraints determined based on the comparison of the timing and loading characteristics with the timing and loading targets imposed by the design rule constraints. For example, clusters that meet the timing and loading targets imposed by the design rule constraints by at least a predefined margin (e.g., 10%) are classified by the computing device as "passing" clusters. Passing clusters that meet the timing and loading targets imposed by the design rule constraints, but by less than the predefined margin are classified by the Computing device as "borderline passing."

At operation 315, the computing device identifies one or more critical clusters from the set of clusters defined by the cluster definitions based on the evaluation of the clusters with respect to the one or more design rule constraints for the IC design. More specifically, in identifying the one or more critical clusters, the computing device identifies one or more clusters that satisfy the one or more design rule constraints by less than a predefined margin. That is, the one or more critical clusters may correspond to clusters that are classified as "borderline passing."

The computing device generates a set of refinement candidates based on the one or more critical clusters, at operation 320. The Computing device generates a refinement candidate by moving one or more pins from a critical cluster to one or more clusters that neighbor the critical cluster. Further details regarding the generation of the set of refinement candidates is discussed below in reference to FIG. 4.

At operation 325, the computing device determines a refinement quality score for each refinement candidate in the set of refinement candidates using a weighted scoring function. The refinement quality score of a refinement candidate is determined based on design metrics including transition, skew, and capacitance. More specifically, the scoring functions includes one or more weighted metrics dynamically determined based on a previous metric value and a target metric value. As noted above, design rule constraints specify target values for these design metrics. In determining the refinement quality score of a refinement candidate, the computing device determines a dynamic weight for each design metric based on a measured value of the metric and the target value for the metric imposed by the design rule constraints. The computing device uses the weighted scoring function with the determined weights for each metric to determine the refinement quality score. Further details regarding the weighted scoring function and the determining of the refinement quality score are discussed below in reference to FIG. 4.

The computing device, at operation 330, selects one or more refinements candidates from the set of refinement candidate based on the refinement quality score associated with each refinement candidate. For example, the computing device may rank the set of refinement candidates based on refinement quality score and select a subset of the set of refinement candidates having the highest rank (e.g., the top 10% highest refinement quality score).

At operation 335, the computing device generates a refined clustering solution based on the one or more refinement candidates selected from the set of refinement candidates. The refined clustering solution includes refined cluster definitions that define groupings of pins of the clock net based on the selected refinement candidate(s). The computing device may supply the cluster definitions in an appropriate file format to one or more internal or external subsystems, or the computing device may store the cluster definitions in a database, in memory, or on disk for subsequent use in one or more processes.

At operation 340, the computing device generates a layout instance of the IC design based on the refined clustering solution. The layout instance defines physical dimensions of the IC design.

As shown in FIG. 4, the method 300 may, in some embodiments, further include operations 405, 410, 415, 420, 425, 430, 435, 440, and 445, Consistent with these embodiments, the operations 405, 410, 415, and 420 may be performed as part of operation 320 (e.g., as a sub-routine or as sub-operations) where the computing device generates refinement candidates.

At operation 405, the computing device selects a critical cluster from the one or more critical clusters identified at operation 315. The computing device may select the cluster based on the margin by which clusters meet the targets imposed by design rule constraints. For example, the computing device may rank the critical clusters based on the margin by which each cluster meet the targets, and the computing device may select the cluster with the lowest: rank.

At operation 410, the computing device identifies one or more neighboring clusters to the critical cluster that satisfy the one or more design constraints by at least the threshold margin. In other words, the computing device finds passing clusters that are nearest neighbors to the selected critical cluster. In an example, the computing device may determine the centroid location for each passing cluster (e.g., the centroid location for a cluster may be computed from the locations of the pins associated with the cluster) and identify the passing clusters with centroid locations that are below a predefined distance value from the selected critical cluster as the neighbors to the selected critical cluster.

The computing device identifies a destination cluster from the neighboring passing clusters to which one or more pins from the critical cluster are to be moved, at operation 415. The computing device may determine a destination cluster for a pin based on a distance of the pin from each of the neighboring passing clusters. For example, the computing device may identify the passing cluster that is nearest to a pin as the destination cluster for the pin.

At operation 420, the computing device moves the one or more pins to the destination cluster. The movement of the one or more pins to the destination cluster results in a refinement candidate. That is, the refinement candidate comprises refined clusters in which the critical cluster excludes the one or more pins and the destination cluster includes the one or more pins.

The computing device may select pin to move on the basis of move cost determined based on a distance of the move. Accordingly, the computing device may rank the pins that form the selected critical cluster according to move cost, and select the pin with the lowest rank (e.g., the pin with the lowest move cost).

Consistent with these embodiments, the operation 325 may include operations 425, 430, 435, 440, and 445 (e.g., as sub-operations or a sub-routine). At operation 425, the computing device determines a previous value for each design metric. The computing device determines the previous metric value for each design metric based on the timing characteristics of the cluster (e.g., transition and skew) and loading characteristics of the cluster (e.g., based on a total capacitance) determined based on the prior evaluation of the claims performed at operation 310.

At operation 430, the computing device determines a dynamic weight associated with each design metric. The computing device determines a dynamic weight for a given design metric based on the previous metric value for the metric and a target value for the metric defined by design rule constraints. More specifically, the computing device may determine a dynamic weight for a design metric as follows:

$$\delta_{metric} = \frac{(1-\alpha)*targetmetric}{\mathrm{MAX}\{(targetmetric - oldmetric), ((1-\alpha)*targetmetric)\}}$$

where $\delta_{metric}$ is the dynamic weight associated with a particular metric, targetmetric is the target value for the metric, oldmetric is the previous value for the metric, and a is the threshold margin used to classify a cluster as "passing" or "borderline passing" with a value between 0 and 1. Thus, in determining the dynamic weight associated with a design metric, the computing device determines a difference between the target value of the metric and the previous value of the metric targetmetric oldmetric) and compares the difference to a scaled value computed based on the target value and the threshold margin ((1-α)*targetmetric). If the scaled value is higher than the difference between the target value and the previous value, $\delta_{metric}$ is 1. Otherwise, the computing device determines $\delta_{metric}$ by calculating a ratio between the scaled value and the difference between the target value and the previous value. It shall be appreciated, that the weight $\delta_{metric}$ is dynamic because it is different for each cluster and it also depends on the current state of the cluster in terms of how far it is from the threshold margin used to determine if it is a "passing" or "borderline passing" cluster. If a cluster is well below the targets for the design metrics then $\delta_{metric}$ will be very small, but will increase as it gets closer to the threshold margin.

The computing device, at operation 435, determines a current value for each metric. For example, the computing device may evaluate the refinement to the critical cluster represented by the refinement candidate to determine current timing and loading characteristics of the refined critical cluster.

For each metric, the computing device determines metric scores based on previous and current values for the metric and the dynamic weight for each metric (operation 440). For example, $$score_{metric} = \delta_{metric} * \frac{(newmetric - oldmetric)}{oldmetric}$$

where $score_{metric}$ is the metric score for a given metric and newmetric is the current value for the metric. As an example, the computing device may determine a metric score for transition based on a previous and current value for transition and the dynamic weight computed for transition.

At operation 445, the computing device determines the refinement score for the refinement candidate based on an aggregate of metric scores. As an example, quality score=$(\omega_{metric_1}*score_{metric_1})+$
$(\omega_{metric_2}*score_{metric_2})+ \ldots$
$+(\omega_{metric_n}*score_{metric_n})$ where quality score is the refinement quality score, and $\omega_{metric_n}$ is a predetermined static weight associated with a given metric. As an example, in determining the refinement score for the refinement candidate, the computing device may aggregate a first metric score corresponding to transition with a second metric score corresponding to skew and a third metric score corresponding to capacitance.

Figure 5:
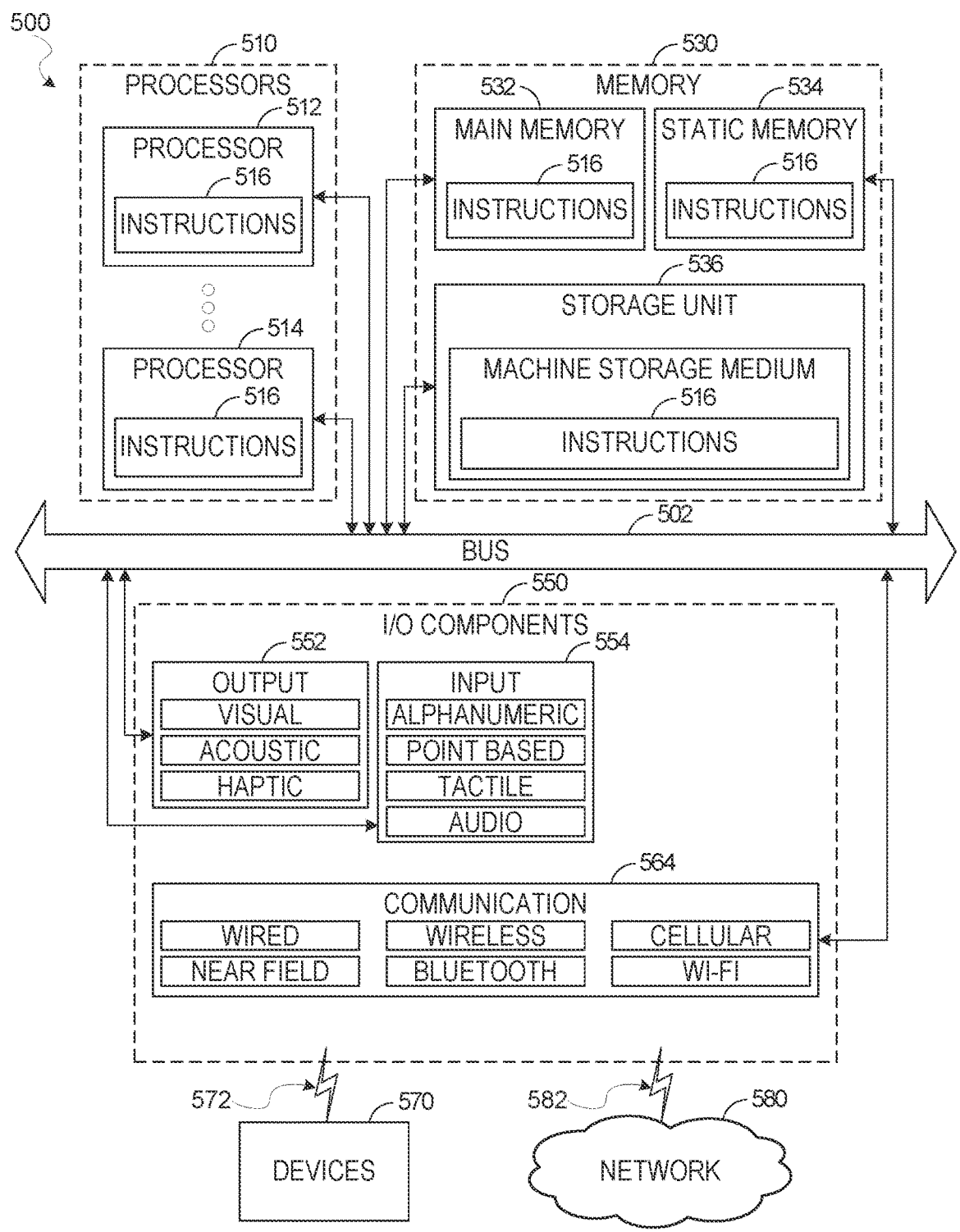
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute method 300. Additionally, or alternatively, the instructions 516 may implement the design flow 100 of FIG. 1. The instructions 516 transform the general, non-programmed machine 500 into a particular machine 500 programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, all accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components to provide communication via other modalities (e.g., near field, Bluetooth, and Wi-Fi). The devices 570 may be another machine or any of a wide variety of peripheral devices (e.g., a peripheral device coupled via a universal serial bus (USB)).

Executable Instructions and Machine Storage Medium

The various memories (e.g., 530, 532, 534, and/or the memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly, be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer-storage medium storing instructions, which when executed by the one or more processors, configure the machine to perform operations comprising:
      accessing, from memory, initial duster definitions for an integrated circuit design, the initial cluster definitions defining a plurality of clusters, each cluster including a plurality of pins;
      evaluating each cluster with respect to one or more design rule constraints;
      identifying one or more clusters from the plurality of clusters based on a result of the evaluating, the one or more clusters satisfying the one or more design rule constraints by less than a threshold margin;
      generating a set of refinement candidates based on the one or more clusters, the generating of the set of refinement candidates comprising generating a refinement candidate by moving one or more pins from a cluster to one or more neighboring clusters;
      determining a refinement quality score for the refinement candidate in the set of candidates using a scoring function that includes one or more weighted metrics dynamically determined based on a previous metric value and a target metric value associated with the refinement candidate;
      selecting the refinement candidate from among the set of refinement candidates based on the refinement quality score; and
      generating refined cluster definitions based on the refinement candidate.

2. The system of claim 1, wherein evaluating each cluster comprises:
   determining timing characteristics of each cluster; and
   comparing the timing characteristics of each cluster with timing targets imposed by the one or more design rule constraints.

3. The system of claim 1, wherein the generating of the refinement candidate further comprises:
   identifying neighboring clusters to the cluster that satisfy the one or more design rule constraints by more than the threshold margin; and
   moving one or more pins from the cluster to a destination cluster selected from the neighboring clusters.

4. The system of claim 3, wherein the operations further comprise identifying the destination cluster based on a distance of the one or more pins from each of the neighboring clusters that satisfy the one or more design rule constraints by more than the threshold margin.

5. The system of claim 3, wherein the identifying of the neighboring clusters to the cluster that satisfy the one or more design rule constraints by more than the threshold margin comprises:
   determining a centroid location for each cluster in the plurality of clusters; and
   identifying a subset of the plurality of clusters having centroid locations below a predefined distance from the cluster as neighboring clusters to the cluster.

6. The system of claim 1, wherein the determining of the refinement quality score for the refinement candidate comprises:
   determining a previous value of a first metric associated with the cluster;
   determining a weight associated with the first metric based on the previous value, the target value, and a current value for the first metric;
   determine a first metric score for the first metric based on the weight associated with the first metric, previous value, and a current value associated with the refinement candidate; and
   calculating the refinement quality score based in part on the metric score.

7. The system of claim 6, wherein calculating the refinement quality score comprises aggregating the first metric score with a second metric score, the second metric score being based on the weight associated with the second metric, a previous value of a second metric, a target value for the second metric, and a current value for the second metric.

8. The system of claim 6, wherein the determining of the weight associated with the first metric comprises:

determining a difference between the target value of the first metric and the previous value of the first metric;
comparing the difference to a scaled value determined based on the target value and a threshold margin; and
based on a result of the comparing, determining a ratio between the scaled value and the difference.

9. A method comprising:
accessing, from memory, an initial clustering solution comprising cluster definitions for an integrated circuit design, the initial cluster definitions defining a plurality of clusters, each cluster including a plurality of pins;
identifying one or more clusters from the plurality of clusters based on evaluation of the plurality of clusters with respect to one or more design rule constraints, the one or more clusters satisfying the one or more design rule constraints by less than a threshold margin;
generating, using one or more processors of a machine; a set of refinement candidates based on the one or more clusters, the generating of the set of refinement candidates comprising generating a refinement candidate by moving one or more pins from a cluster to one or more neighboring clusters;
determining a refinement quality score for the refinement candidate in the set of candidates using a scoring function that includes one or more weighted metrics dynamically determined based on a previous metric value, a target metric value, and a current metric value associated with the refinement candidate;
selecting the refinement candidate from among the set of refinement candidates based on the refinement quality score;
generating a refined clustering solution based on the refinement candidate; and
generating a layout instance based on the refined clustering solution.

10. The method of claim 9, wherein evaluating each cluster comprises:
determining timing characteristics of each cluster; and
comparing the timing characteristics of each cluster with timing targets imposed by the one or more design rule constraints.

11. The method of claim 9, wherein the generating of the refinement candidate further comprises:
identifying neighboring clusters to the cluster that satisfy the one or more design rule constraints by more than the threshold margin; and
moving one or more pins from the cluster to a destination cluster selected from the neighboring clusters.

12. The method of claim 11, further comprising identifying the destination cluster based on a distance of the one or more pins from each of the neighboring clusters that satisfy the one or more design rule constraints by more than the threshold margin.

13. The method of claim 11, wherein the identifying of the neighboring clusters to the cluster that satisfy the one or more design rule constraints by more than the threshold margin comprises:
determining a centroid location for each cluster in the plurality of clusters; and
identifying a subset of the plurality of clusters having centroid locations below a predefined distance from the cluster as neighboring clusters to the cluster.

14. The method of claim 9, wherein the determining of the refinement quality score for the refinement candidate comprises:
determining a previous value of a first metric associated with the cluster;

determining a weight associated with the first metric based on the previous value, the target value, and a current value for the first metric;
determine a first metric score for the first metric based on the weight associated with the first metric, previous value, and a current value associated with the refinement candidate; and
calculating the refinement quality score based in part on the metric score.

15. The method of claim 14, wherein calculating the refinement quality score comprises aggregating the first metric score with a second metric score, the second metric score being based on the weight associated with the second metric, a previous value of a second metric, a target value for the second metric, and a current value for the second metric.

16. The method of claim 14, wherein the determining of the weight associated with the first metric comprises:
determining a difference between the target value of the first metric and the previous value of the first metric;
comparing the difference to a scaled value determined based on the target value and a threshold margin; and
based on a result of the comparing, determining a ratio between the scaled value and the difference between the target value and the previous value.

17. A computer-storage medium storing instructions, which when executed by one or more processors of a machine, cause the machine to perform operations comprising:
evaluating a plurality of clusters with respect to one or more design rule constraints, the plurality of clusters defined by initial cluster definitions included as part of an integrated circuit design;
selecting a cluster from the plurality of clusters based on a result of the evaluating, the cluster satisfying the one or more design rule constraints by less than a threshold margin;
generating a set of refinement candidates based on the cluster, the generating of the set of refinement candidates comprising generating a refinement candidate by moving one or more pins from the cluster to one or more neighboring clusters;
determining a refinement quality score for the refinement candidate in the set of candidates using a scoring function that includes one or more weighted metrics dynamically determined based on a previous metric value and a target metric value associated with the refinement candidate;
selecting the refinement candidate from among the set of refinement candidates based on the refinement quality score;
generating refined cluster definitions based on the refinement candidate; and
generating a layout instance based on the refined cluster definitions.

18. The computer-storage medium of claim 17, wherein the determining of the refinement quality score for the refinement candidate comprises:
determining a previous value of a first metric associated with the cluster;
determining a weight associated with the first metric based on the previous value, the target value, and a current value for the first metric;
determine a first metric score for the first metric based on the weight associated with the first metric, previous value, and a current value associated with the refinement candidate; and calculating the refinement quality score based in part on the metric score.

19. The computer-storage medium of claim 18, wherein calculating the refinement quality score comprises aggregating the first metric score with a second metric score, the second metric score being based on the weight associated with the second metric; a previous value of a second metric, a target value for the second metric, and a current value for the second metric.

20. The computer-storage medium of claim 18, wherein the determining of the weight associated with the first metric comprises:
   determining a difference between the target value of the first metric and the previous value of the first metric;
   comparing the difference to a scaled value determined based on the target value and a threshold margin; and
   based on a result of the comparing, determining a ratio between the scaled value and the difference.

\* \* \* \* \*